United States Patent [19]

Pierce et al.

[11] Patent Number: 4,670,898
[45] Date of Patent: Jun. 2, 1987

[54] DIRECT ACCESS TEST UNIT FOR CENTRAL OFFICE

[75] Inventors: Ben A. Pierce, Thousand Oaks; Leonard E. Curtin, Camarillo; Aaron Chan, Moorpark; Steven R. Coffelt, Ventura, all of Calif.

[73] Assignee: Harris Corporation, Melbourne, Fla.

[21] Appl. No.: 816,158

[22] Filed: Jan. 3, 1986

[51] Int. Cl.$^4$ ............................................. H04B 3/46
[52] U.S. Cl. ........................................ 379/22; 379/29
[58] Field of Search .................. 179/175.2 R, 175.3 R, 179/175.3 F; 371/22

[56] References Cited

U.S. PATENT DOCUMENTS 4,029,913 6/1977 Gunderson .................. 179/175.3 R

Primary Examiner—Stafford D. Schreyer
Attorney, Agent, or Firm—Antonelli, Terry & Wands

[57] ABSTRACT

A direct access test unit for testing subscriber lines is located in the central office and is accessable from a remote location through a standard ground start line circuit. The field technician involved in a troubleshooting problem dials the number of the ground start line circuit followed by a security code to gain access to the test unit which then returns dial tone. Dialing the number of a subscriber line to be tested provides for access to that line via the test unit and a test trunk connected thereto. Various tests may be performed on the subscriber line thus accessed by dialing a selected digit to identify the test. The test unit provides voice messages to the field technician to instruct in the use of the test unit and explain the available test operations and how they may be initiated.

19 Claims, 1 Drawing Figure

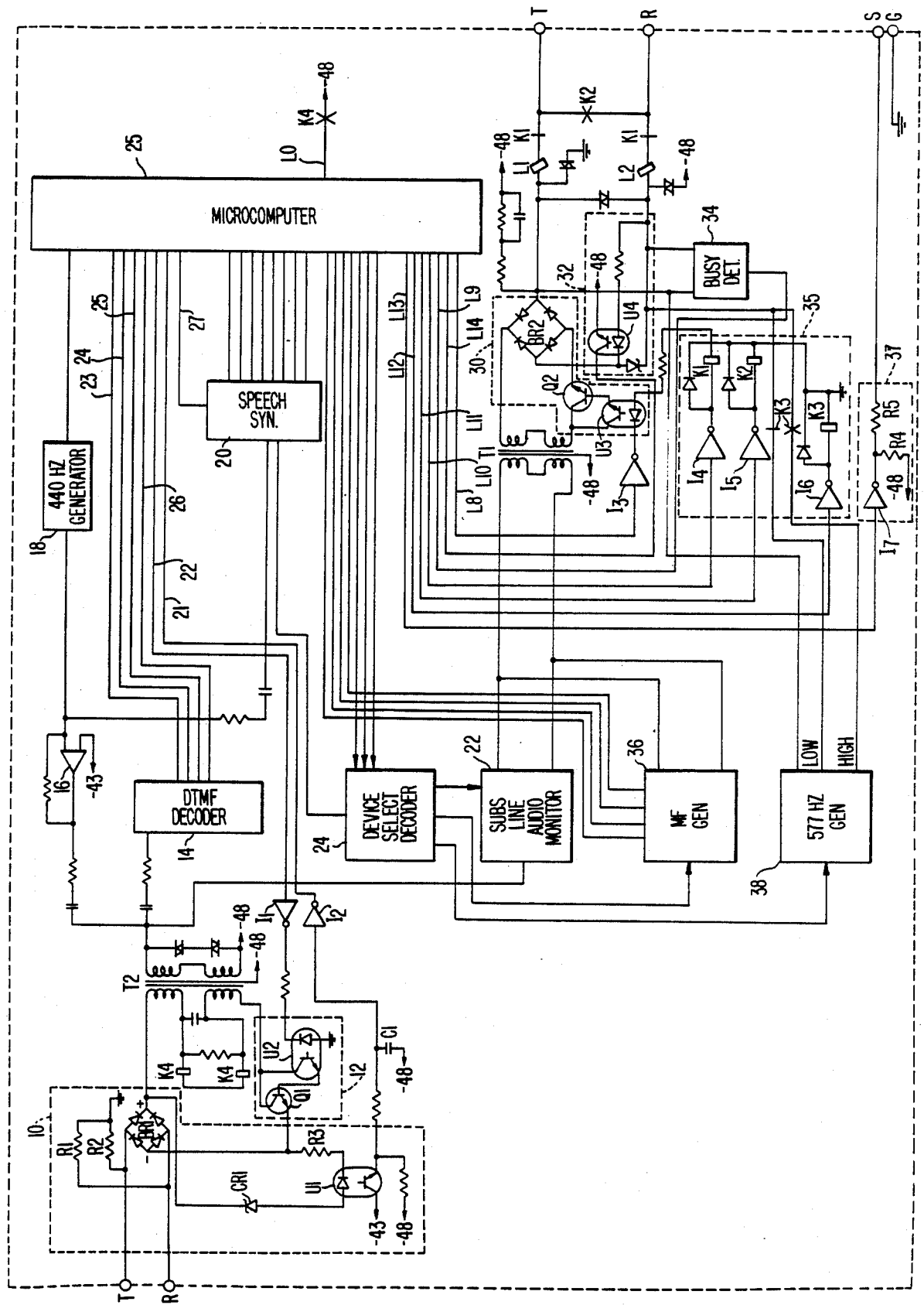

DIRECT ACCESS TEST UNIT FOR CENTRAL OFFICE

BACKGROUND OF THE INVENTION

The present invention relates in general to telephony equipment, and more particularly to a direct access test unit located within a central office and which allows a field repair person to perform specific pre-test functions on any selected subscriber line from a remote location without assistance of personnel within the central office.

In order to provide the high degree of dependability and efficiency of service demanded by the public, it is necessary to maintain telephone equipment in properly working order at all times and to make it possible to detect and correct faults in such equipment quickly, so as to reduce disruption of service to a minimum. For this purpose, there have been developed various types of automatic central office test equipment which operates independently within the central office to periodically test all circuits to determine that they are operating properly, and when faults are detected, the location and identification of the fault is indicated so that repair may be made to maintain proper service. However, this equipment is confined to the central office, and is not accessible to service personnel from remote locations for selective testing of subscriber lines.

During the course of installation of subscriber equipment, as well as during the testing of subscriber lines to detect malfunctions, it is often necessary for service personnel located at the site of the subscriber equipment to effect certain tests of the subscriber lines associated with that equipment through the central office. For this purpose, there is equipment located at central offices which permits the linesman to conduct mechanical loop tests, dial-up for test tones and dial-up "quiet termination" tests, whereby resistance is placed across the line at the central office. However, all such tests are limited to the testing of the single subscriber line which the linesman is presently connected to at the central office. The testing of other lines at the central office as desired by the linesman can be effected only by contacting personnel within the central office for assistance in connection with such tests, or by effecting connection to successive subscriber lines to perform individual tests on these lines, which is a tedious process.

Thus, with present-day equipment, the operations to be performed by the linesman in testing subscriber lines can be time consuming and may require the assistance of other personnel within the central office, which is undesirable from an economical point of view and conflicts with the general desire of telephone companies to employ a fully automated central office. Thus, the need for test equipment which permits direct access by the linesman to any subscriber lines within the central office for testing has been evident for some time.

However, in the provision of more sophisticated test equipment, one must be mindful of the fact that with the availability of more complex test functions there often comes the need for more highly trained personnel to operate that equipment. Thus, such new equipment should be designed for ease of use so that even relatively untrained personnel will be able to use it without difficulty. Further, for equipment which is capable of being accessed from remote locations, the need for security arises to prevent operation of the equipment by unauthorized personnel. Finally, in the design of any equipment there are always the overriding considerations of economy of manufacture, dependability and simplicity of construction.

SUMMARY OF THE INVENTION

It is a main object of the present invention to provide a direct access test unit for use within a central office to provide for the testing of subscriber lines from a remote location.

It is another object of the present invention to provide a device of the type described which allows a field technician to remove battery and ground from, and to open, short or place a tone on, any telephone line at the central office where the device is installed, from a remote location.

It is still another object of the present invention to provide a device of the type described which generates voice messages to guide the field technician through each test operation or to explain error conditions.

A further object of the present invention resides in the provision of a direct access test unit which allows the field technician to selectively perform various tests on any subscriber line through a central office from a remote location without the assistance of personnel at the central office.

Still a further object of the present invention is to provide a direct access test unit whose operations may be determined and modified from a remote location by authorized personnel performing selected programming functions.

In accordance with the present invention, the direct access test unit is installed within the equipment frame inside the central office, and it has an access port connected to a ground start line circuit and an output port connected to a no-test trunk circuit. The device is compatible with all types of central offices, such as an electronic switching system or a cross bar central office. Upon detection of ringing voltage from the ground start line circuit connected to the access port, dial tone is provided to indicate that the device is waiting for a security code entry, and upon receipt of the security code entry, dial tone is again supplied to indicate that the device is waiting for a subscriber number entry. The field technician may then access any subscriber line through the central office by generating the appropriate subscriber number, and the device will access that subscriber line via the test trunk connected to its output port.

One of the features of the present invention resides in the provision of voice messages to guide the field technician through various test operations and to explain a resulting error condition when detected. When the field technician fails to take appropriate action at various stages in the testing operation, the device provides an appropriate voice message to indicate to the technician the next operation to be performed or a selection of tests available and the codes required for selection of these tests.

As another feature of the present invention, the device is designed so as to not interfere with a legitimately busy line. Thus, when a subscriber line under test is found to be busy, all test functions, except for application of the low level simplex tone, are disabled. However, the device allows the field technician to monitor the busy subscriber line; although, the voice data on the line is scrambled so as to not be intelligible. This permits the field technician to determine what signals are on the line and also to determine whether the line is legitimately busy.

A further feature of the present invention resides in the fact that the device allows the field technician to access a new subscriber line without going on hook, thereby significantly reducing the access time to complete a test operation involving a number of subscriber lines. The device will normally disconnect the subscriber line immediately after the field technician goes on hook; however, it also has the capability of continuing any test function for a period of time after the subscriber has gone on hook, if so directed.

Access to the device requires the generation of a particular security code by the field technician, and the line is automatically released after a predetermined number of unsuccessful attempts to generate the correct security code. The device is able to translate seven digits to five digits and add up to ten different steering digits for central offices requiring only five digits access.

BRIEF DESCRIPTION OF THE DRAWING

These and other objects, features and advantages of the present invention will be understood more clearly from the following detailed description with reference to the accompanying drawing, in which the single FIGURE represents a schematic diagram of a preferred embodiment of the invention.

DESCRIPTION OF THE PREFERRED EMBODIMENT

The direct access test unit, which is to be installed within the central office, has an input access port section and an outgoing trunk section. The input access port section has an input port providing tip T and ring R terminals for connection to a standard ground start line circuit. The tip T and ring R terminals are connected via a rectifier bridge BR1, which forms part of the ring detect circuit 10, to a standard line transformer T2 of the type typically found in line circuits. A line seize circuit 12 is connected via the rectifier bridge BR1 across the primary windings of the line transformer T2, and a relay K4 is also connected to the primary windings of the line transformer T2 for performing loop current detection.

Four circuits are connected to the secondary windings of the line transformer T2. The first of these circuits is a DTMF decoder 14 which detects multifrequency dial tones received via the line circuit connected to the tip T and ring R terminals and decodes these tones to the corresponding subscriber line numbers. The second circuit comprises a 440 Hz generator 18 which supplies secondary dial tone via the amplifier 16 to indicate to the user that the device is waiting for either a subscriber number entry or a security code entry. The third circuit is a speech synthesizer circuit 20 which provides various voice messages through the amplifier 16 to guide the user through each test operation and to explain detected error conditions. The fourth circuit is a subscriber line audio monitor 22 which applies audio in scrambled form from a subscriber line under test, when the line is indicated as busy, through the line transformer T2 so that the field technician may monitor the audio. These four circuits 14, 18, 20 and 22 operate under control of a microcomputer 25.

The outgoing trunk section of the direct access test unit is provided with an output port including tip T, ring R, sleeve S and ground G terminals to be connected within the central office to a standard no-test trunk circuit, such as a Western Electric Company type 1A 186-01 or equivalent. The tip T and ring R terminals are connected through standard relays L1 and L2 and a rectifier bridge BR2 to the primary windings of line transformer T1. The rectifier bridge BR2 forms part of a trunk seize circuit 30, which is controlled by the microcomputer 25, and there is also connected across the bridge rectifier BR2 and battery reverse detection circuit 32.

The secondary windings of the line transformer T1 are connected to the subscriber line audio monitor 22 and also to a multifrequency generator 36 from which multifrequency signalling is applied through the transformer T1 to the tip and ring leads to the no-test trunk under control of the microcomputer 25. A busy detect circuit 34 is also connected across the tip T and ring R terminals of the output port to detect a busy condition of the subscriber line under test. A test function circuit 35 includes various relays which operate to perform the desired tests of the subscriber line accessed through the no-trunk circuit and a sleeve control circuit 37 controls communication with the no-test trunk via the sleeve S after the direct access test unit has cut through to the no-test trunk. Finally, a 577 Hz generator 38 performs the tests involving the application of high level and low level test tones across the tip and ring leads to the subscriber line under test.

The speech synthesizer circuit 20, the subscriber line audio monitor 22, the multifrequency generator 36 and the 577 Hz generator 38 are controlled by a device select decoder 24 in response to a 3-bit code supplied from the microcomputer 25. In this way, these circuits can be selected for operation one at a time under control of the microcomputer 25.

The operation of the direct access test unit will be described with reference to an example in which the field technician is to test a subscriber line A from a remote location where a subscriber line B is available for his use. Accordingly, the field technician will dial the number of the ground start line circuit which is connected to the input port of the direct access test unit using subscriber line B. In this disclosure, references to dialing a subscriber line number and the terms "dialing signals" and "dialed digits" are used in a generic sense to include all standard forms of generating subscriber line designating signals, whether they be dial impulses or multifrequency tones.

Upon being accessed in this way, the ground start line circuit connected to the tip T and ring R terminals of the input access port of the direct access test unit will apply ringing to the rectifier bridge BR1 in the ring detector circuit 10. Ringing voltage of more than 55 volts RMS will cause the Zener diode CR1 to conduct, which completes the circuit through the resistance R3 and the optical isolator U1 across the output of the bridge BR1. When the optical isolator U1 is turned on, the capacitor C1 charges, and the signal is supplied through the inverter I2 and line 21 to the microcomputer 25 to indicate that ringing has been detected. The microcomputer 25 responds by applying a signal on line 22, causing the optical isolator U2 in the line seize circuit 12 to turn on, which causes the transistor Q1 to conduct, closing the loop across the incoming tip and ring lines. This causes ring trip in the ground start line circuit. When the line is seized in this way, loop current will be detected by the relay K4 connected to the primary windings of the bridging transformer T2, applying a signal on line L0 to the microcomputer 25 to indicate the detection of loop current.

When the line has been seized and the loop current detected in the manner described above, the microcomputer 25 supplies a 440 Hz square wave to the input of the generator 18, which is composed of a multiple feedback bandpass filter having a center frequency at 440 Hz and an integrator, for purposes of supplying secondary dial tone through the amplifier 16 and bridging transformer T2 to the line. Upon receiving this secondary dial tone, it is necessary for the field technician to dial a user security code to gain access to use of the test unit, and this user security code, which is stored in the microcomputer 25 should be known to the field technician, if he is authorized to utilize this test unit. If the field technician takes no action at all, the microcomputer will automatically release the line after a certain predetermined time has expired. On the other hand, if the field technician dials the proper user security code, the dialing signals will be received and detected by the DTMF decoder 14, and a four bit digit will be supplied on lines L3–L6 to the microcomputer 25 to identify each digit of the dialed code. The received digits are then compared with the user security code stored within the microcomputer 25 to determine whether the user should be permitted access to the test unit. Detection of the first dialed digit by the decoder 14 causes the microcomputer 25 to instantly remove the secondary dial tone from the line, as is conventionally done in standard line circuits, and if the digits received by the microcomputer 25 correspond to the authorized user access code, secondary dial tone will be supplied once again from the generator 18 to the line to inform the field technician that he has been given access to the test unit. If the received digits do not correspond to the authorized user access code, the secondary dial tone will not be applied to the line for the second time and the field representative will then know that he has either made an error in dialing the access code or has the wrong access code. The microcomputer 25 will permit the user to try again a predetermined number of times to obtain access to the test unit by supplying the proper user access code; however, if this is not achieved within a predetermined number of tries, the microcomputer 25 would automatically release the line. The field representative will then know that he has either made an error in dialing the access code or has the wrong access code. Further, when dialing the user access code, if the first digit of the code is not entered within a certain period of time of receipt of a dial tone, or if too much time elapses between digits, the unit will automatically disconnect.

Assuming that the field technician has dialed the proper user access code and has now received secondary dial tone once again, he should then dial the number of the subscriber line circuit A which he desires to test. If he takes no action for a period of seven seconds for some reason, the microcomputer 25 will select the speech synthesizer circuit via the device select decoder 24 and apply a strobe signal on line L7 thereto along with address signals selecting a chip from which the voice message "dial seven digit subscriber line number" is read as an audio signal through the amplifier 16. Thus, the voice message, which occurs seven seconds after the start of the second dial tone, informs the user that a seven digit subscriber line number should be dialed at that itme. Obviously, if the field technician is familiar with the use of the test unit, he will not need to wiat for the voice message, but can immediately begin dialing the seven digit subscriber line number upon receipt of the second dial tone, in which case the microcomputer 25 will not call upon the speech synthesizer circuit 20. If a digit is not dialed within one minute of receipt of the secondary dial tone, the unit simply disconnects.

The seven digit subscriber line number dialed by the field technician will be detected by the decoder 14 and the digits will be supplied to the microcomputer 25. Depending upon the particular central office in which the test unit is installed, the microcomputer 25 is programmed to translate the seven digits to four or five digits and to add up to ten different steering digits for those central offices requiring only four or five digits access. To access the subscriber line designated by the received digits, the microcomputer 25 seizes the trunk circuit by outputting a logic high on line L8 to the inverter I3, which inverts this signal and turns on the optical isolator U3 which renders the transistor Q2 conductive, closing the loop across tip and ring on the outgoing trunk, and then selects the multifrequency generator 36 via the device select decoder 24 and supplies thereto a control signal for selecting the frequency pairs which designate the various digits required to identify the subscriber line circuit to be accessed. These multifrequency signals are supplied from the generator 36 through the line transformer T1 to the tip and ring lines of the no-test trunk. Reverse battery supervision is detected by the circuit 32, in which the opto-isolator 34 detects battery reversal and signals this condition to the microcomputer 25 via line L14.

Once this subscriber line circuit to be tested via the no-test trunk has been accessed, the busy detector circuit 34 will determine whether the line circuit is busy by detecting the level of the loop current and the level of the voltage on the ring lead. If the subscriber line is busy, the busy detector circuit 34 will signal this condition to the microcomputer 25 on line L9 and all testing of the subscriber line circuit will be inhibited except for application of the low level simplex tone. At this point, the microcomputer 25 does two things. First of all, it accesses the speech synthesizer 20 via the device select decoder 24 and applies the strobe signal on line L7 along with the address signals necessary to read out the voice message "busy line" to the user via the amplifier 16 and line transformer T2. At the same time, the audio monitor test function is automatically invoked by the microcomputer 25, which selects the subscriber line audio monitor 22 via the device select decoder 24. The subscriber line audio monitor 22 receives the audio on the accessed subscriber line via the line transformer T1, scrambles it and applies the scrambled audio directly to the line transformer T2 so that the field technician can monitor this scrambled audio signal. The field technician may also dial a single digit to provide application of the low level simplex tone to the subscriber line, which is the only test not disabled under these conditions, but attempts to initiate other tests of the busy circuit will simply result in a repeat of the voice message "busy line". At the end of one miniute of monitoring the busy line, the unit will automatically return to the test mode and a voice message will be generated to indicate the options available as will be explained later.

If the subscriber line being accessed is found to be not busy, the microcomputer 25 will again access the speech synthesizer circuit 20 via the device select decoder 24 and apply the strobe signal on line L7 along with proper addresses to read out a voice message "OK". This voice message indicates to the field technician that access has been made to the designated subscriber line, which has been found to be idle. The field technician may then dial a single digit to select a particular test to be performed with respect to the subscriber circuit, and he will do so immediately if he is familiar with the test unit and its operation. If no digit is dialed by the field technician within seven seconds of the "OK" voice message, the microcomputer 25 will again enable the speech synthesizer circuit 20 to read out a series of voice messages listing the different test functions that may be performed by dialing various digits. An example of such voice messages is indicated below:

DIAL TWO FOR AUDIO MONITOR
DIAL FOUR FOR HIGH LEVEL TONE
DIAL FIVE FOR LOW LEVEL TONE
DIAL SIX TO OPEN SUBSCRIBER LINE
DIAL SEVEN TO SHORT SUBSCRIBER LINE
DIAL STAR TO KEEP TEST AFTER DISCONNECT
DIAL POUND FOR NEW SUBSCRIBER LINE

The field technician may then select one of the test functions to be initiated and dial the appropriate digit. Each time a test function is started in response to a digit dialed by the field technician, the microcomputer 25 will cause the speech synthesizer circuit 20 to issue a voice message identifying that test function, such as "audio monitor", "high level tone", "low level tone", "open line" and "short line". After selection of the hold test utility function, the voice message "dial number of minutes" will be read out, and the field technician is expected to dial a single digit to designate the number of minutes the test currently in progress is to remain in effect after disconnect. Thus, while the test unit normally will disconnect immediately when the subscriber goes on hook, the unit has the capability of continuing a test function from one to ten minutes after going on hook, if so instructed.

After each of the test functions initiated by the field technician and receipt of the appropriate voice message identifying that test function, the field technician may then dial another digit to select a new test or utility function. In addition, as apparent from the foregoing list of voice messages relating to test functions, when the field technician completes the testing of a particular subscriber line, it is not necessary for him to disconnect from the test unit in order to access another subscriber line for testing. After receiving a voice message acknowledging the completion of any test, the field technician can simply dial POUND for a new subscriber line, and the microcomputer 25 will place secondary dial tone from the generator 18 on the line indicating that the unit is prepared to receive the dialed digits relating to a new subscriber line.

The various test functions are performed by selectively operating the relys K1, K2 and K3 in the test function circuit 35 from the microcomputer 25. To perform an open test on the subscriber line, the microcomputer 25 places a high on line L10 to the inverter I4 so as to operate the relay K1 which opens the tip and ring lines connected from the rectifier bridge BR2 to the tip T and ring R terminals of the output port. To perform a short test, the microcomputer 25 places a high on line L11 to the inverter I5 so as to operate the relay K2. This places a short across the tip and ring lines to the trunk circuit so that a short test of the DC resistance can be made.

To perform the low level or high level tone test, the microcomputer 25 selects the 577 Hz generator 38 via the device select decoder 24. For a low level tone test, the microcomputer 25 maintains a low on the line L12 to the inverter 16 so as to maintain the relay K3 unenergized. The low level tone will then be applied from the generator 38 across tip and ring to perform the longitudinal simplex low level tone test which will not disturb traffic on a busy line. To perform the differential high level tone test, the microcomputer 25 places a high on line L12 while the generator 38 is selected so as to energize the relay K3 via the inverter 16. This places the high level tone across tip and ring to the trunk circuit.

The test unit has two current level control, i.e., both high and low, on the sleeve to the no-test trunk. After the test unit cuts through to the test trunk, it communicates with the trunk via the sleeve current. For the low current state, the microcomputer 25 maintains a low on the line L13 so that current on the sleeve will pass both through resistor R4 and resistor R5. In the high current state, however, the microcomputer 25 will place a high on line L13 to the inverter I7, so that current passes only through the resistor R5, bypassing the resistor R4.

The test unit may also be programmed for those subscriber line prefixes which will be used in the testing on line circuits. For this purpose, a predetermined number of three-digit prefixes can be stored in the memory of the microcomputer 25. If an attempt is made during subscriber line number entry to use a prefix that has not been programmed, the unit will respond with an error message.

The microcomputer 25 is a conventional device including a microprocessor and non-volatile memory for storing of data and programs necessary to perform the functions described herein. In addition to controlling the overall operation of the direct access test unit, the microcomputer 25 performs certain housekeeping tasks, such as maintaining a count of the various accesses to the unit, storing of data relating to subscriber lines to be accessed, storing the required security codes and maintaining a listing of the identification of prefixes to be used for the different tests capable of being initiated by the test unit.

In addition to accessing subscriber lines and initiating various designated tests with respect to these lines, it is also possible to access the test unit for purposes of changing the data stored therein relating to security access codes, the prefixes utilized to identify the test functions and to obtain access to the various counters for obtaining a reading of the data therein. For this purpose, the field technician simply dials the number of the ground start line circuit connected to the input port of the test unit in the same manner already described, but upon initial receipt of the secondary dial tone, instead of dialing a user security code, the field technician will dial a system security code. The microcomputer 25 will respond to a correctly dialed system security code by reading out from the speech synthesizer circuit 20 the message "OK". In response to this voice message, the field technician can then dial a single digit to select a particular programming function. If he does not do so within seven seconds after the "OK" message, the microcomputer 25 will automatically read out a series of voice messages identifying the different single digits which will initiate various programming functions. An example of such voice messages is listed below:

DIAL ONE TO CHANGE SYSTEM SECURITY CODE
DIAL TWO TO CHANGE USER SECURITY CODE

DIAL THREE TO ADD PREFIX
DIAL FOUR TO CLEAR ALL PREFIXES
DIAL FIVE TO SET NUMBER OF DIGITS TO ACCESS SUBSCRIBER LINE
DIAL SIX TO READ PREFIXES
DIAL SEVEN TO READ ACCESS COUNTER
DIAL EIGHT TO READ JOB COUNTER
DIAL NINE TO CLEAR ALL COUNTERS
DIAL ZERO TO CLEAR ALARM
DIAL STAR TO SELECT DIALING METHOD

The field technician may then proceed to select one of the programming functions by dialing a single digit corresponding to that programming function. As can be seen, it is possible to change the system security code or the user security code, to add a prefix, to clear all prefixes, to set the number of digits required to access a subscriber line (for a particular central office), to read the prefixes, to read the access counter, to read the job counter, to clear all counters, to clear an alarm, and to select a dialing method. As in the case of initiating test functions relating to a subscriber line circuit, after after programming function is selected, the microcomputer 25 will cause the speech synthesizing circuit 20 to read out a voice message identifying that programming function or indicating the next operation to be performed by the field technician to complete the selected programming function.

As can be seen from the foregoing description, the present invention provides a direct access test unit which allows the field technician to access any line circuit within the central office through a single designated line circuit connected to the input port of the test device while he is trying to trouble-shoot a problem. In this way, he byapsses all of the normal personnel previously required to perform such tests through the central office, thereby facilitating more complete automation of the central office. A considerable saving in the time required for the testing of line circuits also results from the fact that the field technician does not need to initiate a new connection to the central office each time a new subscriber line is to be tested. Rather, once access has been obtained to the direct access test unit, it is possible to test a succession of lines without going on hook and dialing the new subscriber line for each line to be tested. It has been estimated that as much as 15 minutes may be saved for every test call that the field technician makes in the course of trouble-shooting a particular problem.

In addition, the provision of voice messages to guide the user through each test operation or explain errors in the operations performed by the field technician permit even those not particularly skilled with this type of equipment to use it effectively.

While we have shown and described only one embodiment in accordance with the present invention, it is understood that the same is not limited thereto but is susceptible of numerous changes and modifications as known to one having ordinary skill in the art and we therefore do not wish to be limited to the details shown and described herein, but intend to cover all such modifications as are encompassed by the scope of the appended claims.

What is claimed is:

1. A direct access test unit to be connected in a central office to a line circuit and a test trunk circuit for testing subscriber lines in response to commands received from remote locations, comprising:
an input access port having tip and ring terminals to be connected to a line circuit in said central office;
an output access port having tip, ring, sleeve and ground terminals to be connected to a test trunk circuit in said central office;
decoder means connected to said input access port for detecting and decoding dialing signals indicating a designated subscriber line and received from a remote location via said line circuit;
generator means for generating dialing signals to be applied to said test trunk circuit; and
processor control means responsive to decoded dialing signals from said decoder means for connecting said generator means to said output access port and for controlling said generator means to generate dialing signals indicating said designated subscriber line.

2. A direct access test unit according to claim 1, further including test circuit means connected to said output access port and controlled by said processor control means for performing selected tests on said designated subscriber line in response to commands received from said remote location via said line circuit and said input access port.

3. A direct access test unit according to claim 2, wherein said test circuit means includes means responsive to a control signal from said processor control means for connecting a short circuit across said tip and ring terminals of said output access port.

4. A direct access test unit according to claim 2, wherein said test circuit means includes means responsive to a control signal from said processor control means for applying a test tone signal across said tip and ring terminals of said output access port.

5. A direct access test unit according to claim 4, whrein said test tone signal applying means is capable of selectively generating high or low level tone signals under control of said processor control means.

6. A direct access test unit according to claim 2, wherein said test circuit means includes means responsive to a control signal from said processor control means for producing an open circuit condition from said output access port to said designated subscriber line via said test trunk circuit.

7. A direct access test unit according to claim 1, further including sleeve control means responsive to a control signal from said processor control means for controlling the current at the sleeve terminal of said output access port.

8. A direct access test unit according to claim 2, wherein said processor control means includes means responsive to said decoder means detecting and decoding dialing signals representing at least one digit from said remote location for controlling said test circuit means to perform a selected test designated by said dialing signals on said designated subscriber line.

9. A direct access test unit according to claim 1, further including speech synthesizing means responsive to control signals from said processor control means for applying selected voice emssages through said input access port.

10. A direct access test unit according to claim 9, wherein said processor means includes means responsive to said decoder means detecting and decoding dialing signals representing at least one digit from said remote location for controlling said speech synthesizer to apply a selected voice message to said input access port.

11. A direct access test unit according to claim 9, wherein said voice messages include instructions for initiating the testing of a selected subscriber line circuit via said output access port.

12. A direct access test unit according to claim 9, further including test circuit means connected to said output access port and controlled by said processor control means for performing selected tests on said designated subscriber line in response to commands received from said remote location via said line circuit and said input access port.

13. A direct access test unit according to claim 12, wherein said voice message include information relating to the status of tests performed by said test circuit means.

14. A direct access test unit according to claim 2, further including ring detector means connected to said input access port for detecting ringing voltage received from said line circuit, a voice bridge transformer for conducting dialing signals to said decoder means, line seize means for selectively connecting said voice bridge transformer to said input access port and dial tone generator means for generating a dial tone signal, said processor control means including means rseponsive to said ring detector means detecting a ringing voltage for actuating said line seize means to connect said voice bridge transformer to said input access port and for actuating said dial tone generator means to apply said dial tone signal through said voice bridge transformer to said input access port.

15. A direct access test unit according to claim 14, further including busy detect means connected to said tip and ring terminals for detecting a busy condition in a subscriber line connected to said output access port via said test trunk and audio monitor means for selectively supplying audio signals received from said output access port to said voice bridge transformer to permit said audio signals to be monitored at said remote location, said processor control means including means responsive to said busy detect means for enabling said audio monitor means to supply said audio signals to said remote location when said designated subscriber line is busy.

16. A direct access test unit according to claim 15, wherein said audio monitor means includes means for scrambling said audio signals so as to render them unintelligible at some remote location.

17. A direct access test unit according to claim 14, wherein said processor control means includes means for releasing said line seize means if dialing signals representing a predetermined access code are not detected by said decoder means a predetermined time after said dial tone signal has been applied to said input access port in response to detection of ringing voltage by said ring detector means.

18. A direct access test unit according to claim 14, wherein said processor control means includes means responsive to detection and decoding by said decoder means of dialing signals received at sequential intervals and identifying different subscriber lines for controlling said generator means to generate dialing signals at said sequential intervals identifying said different subscriber lines without releasing said line seize means.

19. A direct access test unit according to claim 1, wherein said processor control means includes means responsive to dialing signals representing a certain number of digits indicating a designated subscriber line, as detected and decoded by said decoder means, for controlling said generator means to generate dialing signals representing a different number of digits which also indicate the same designated subscriber line.

* * * * *